United States Patent
Veshchikov

(10) Patent No.: US 10,894,365 B2
(45) Date of Patent: Jan. 19, 2021

(54) METHOD FOR EMBEDDING AN INTEGRATED CIRCUIT INTO A 3D-PRINTED OBJECT

(71) Applicant: NXP B.V., Eindhoven (NL)

(72) Inventor: Nikita Veshchikov, Brussels (BE)

(73) Assignee: NXP B.V., Eindhoven (NL)

( * ) Notice: Subject to any disclaimer, the term of this patent is extended or adjusted under 35 U.S.C. 154(b) by 280 days.

(21) Appl. No.: 16/109,154

(22) Filed: Aug. 22, 2018

(65) Prior Publication Data

US 2020/0061929 A1 Feb. 27, 2020

(51) Int. Cl.
  *B29C 64/40* (2017.01)
  *B29C 64/386* (2017.01)
  *G06K 19/07* (2006.01)
  *B29C 64/118* (2017.01)
  *B29C 64/194* (2017.01)

(52) U.S. Cl.
  CPC ............ *B29C 64/40* (2017.08); *B29C 64/118* (2017.08); *B29C 64/194* (2017.08); *B29C 64/386* (2017.08); *G06K 19/0723* (2013.01)

(58) Field of Classification Search
  None
  See application file for complete search history.

(56) References Cited

U.S. PATENT DOCUMENTS

| | | | |
|---|---|---|---|
| 2015/0248678 A1 | 9/2015 | Wee et al. | |
| 2016/0067927 A1 | 3/2016 | Voris et al. | |
| 2016/0259306 A1 | 9/2016 | Pangrazio, III et al. | |
| 2017/0334139 A1* | 11/2017 | Ammi | B29C 64/106 |
| 2018/0050486 A1 | 2/2018 | Talgorn et al. | |
| 2019/0118474 A1* | 4/2019 | Hikmet | B33Y 80/00 |

FOREIGN PATENT DOCUMENTS

| | | |
|---|---|---|
| WO | 2017207514 A1 | 12/2017 |
| WO | 2019029979 A1 | 2/2019 |

* cited by examiner

*Primary Examiner* — Edmund H Lee
(74) *Attorney, Agent, or Firm* — Daniel D. Hill

(57) ABSTRACT

A method is provided for embedding an integrated circuit (IC) into a 3D-printed object. The method includes providing a filament having a material for 3D-printing an object, and an integrated circuit embedded within the filament material. The filament is used to form at least part of the 3D-printed object. A 3D-printing system is provided for implementing the method. The 3D-printing system includes a filament dispenser for storing and dispensing the 3D-printing filament. A platform provides a work surface for supporting the object as the object is being printed. A processor is provided for controlling a printing operation of the 3D-printer, and for 3D-printing the object with the filament having the ICs embedded therein. A configuration circuit is provided for configuring the IC as the IC is embedded in the 3D-printed object.

13 Claims, 4 Drawing Sheets

METHOD FOR EMBEDDING AN INTEGRATED CIRCUIT INTO A 3D-PRINTED OBJECT

BACKGROUND

Field

This disclosure relates generally to 3D (three-dimensional)-printing, and more particularly, to a method and 3D-printing system for embedding an integrated circuit into a 3D-printed object.

Related Art

The use of 3D-printing is becoming more common and more easily accessible. Product prototypes can be more quickly built with 3D-printing, allowing faster time to market. With 3D-printing, designers and creators have a new tool for testing ideas and for creating pieces of art and other objects. However, 3D-printing can also enable the relatively easy copying of someone else's products. For example, a company's successful product, that required time and expense to design and produce, may be copied and sold by a competitor simply by using 3D-printing technology.

As protection from copying, an identification tag can be embedded in a 3D-printed object. There are various types of identification tags. One type is called RFID (radio frequency identification) that involves the use of an integrated circuit (IC) tag that can be interrogated wirelessly. Another type of tag uses near field communication (NFC) for short range wireless communication. It would be desirable to have a method for embedding a tag into a 3D-printed object that was easy and did not interfere too much with the normal 3D-printing process. Also, the tag should not be easily removable from the object.

Therefore, a need exists for a way to embed an IC in a 3D-printed product that accomplishes at least some of the above goals.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
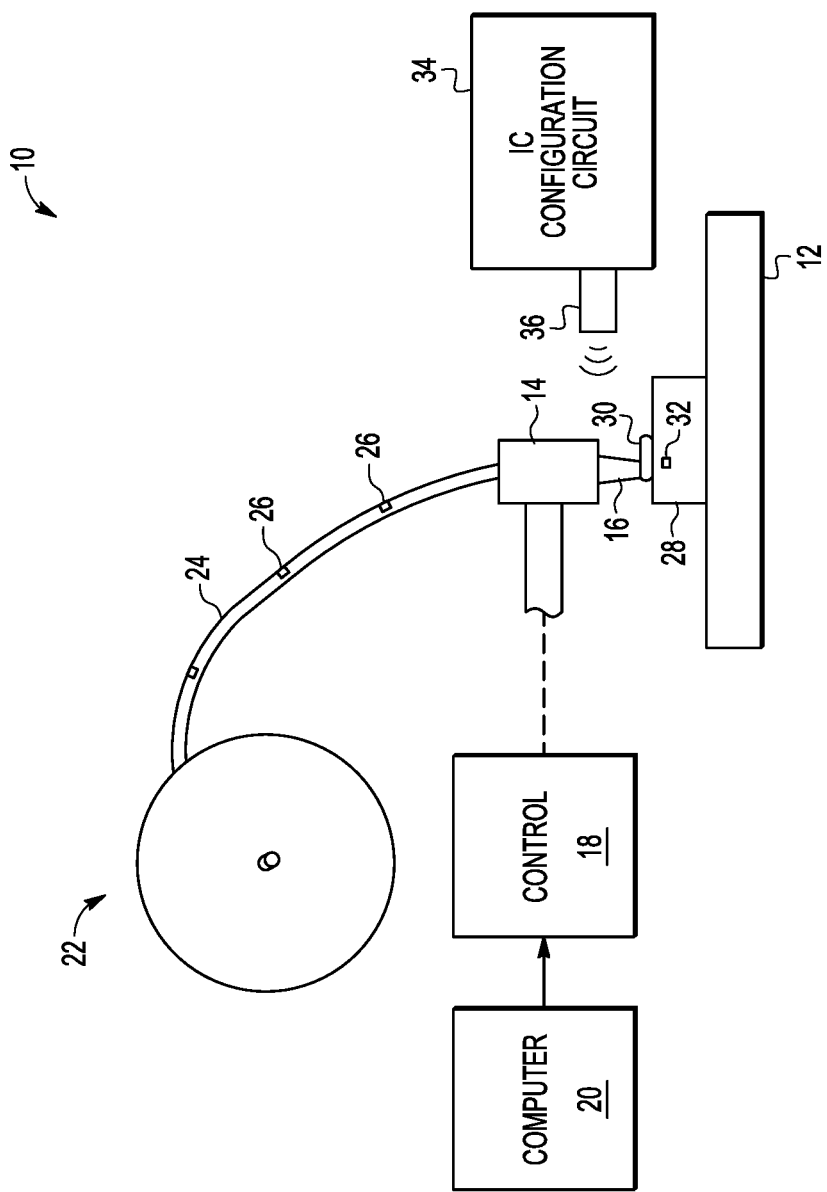
FIG. 1 illustrates a conceptual diagram of a 3D-printing system in accordance with an embodiment.

Generally, there is provided, a method and a 3D-printing system for embedding an IC into a 3D-printed object. In one embodiment, a filament used to provide a material for 3D-printing an object includes an integrated circuit embedded within the filament. The filament is used in the 3D-printing system to form the object and embed the IC while the object is being 3D-printed. In one embodiment, the IC is configured for use as a tag for identifying, for example, a source of manufacture of the object. The IC may have an antenna attached and included in the filament. The IC and antenna may be extruded together while printing the object. The method and 3D-printing system can be used to more easily provide an object with an embedded IC that does not complicate manufacturing of the object, and can be less costly than other methods to embed an IC.

In accordance with an embodiment, there is provided, a method for embedding an integrated circuit into a 3D-printed object, the method including: providing a filament comprising a material for 3D-printing an object, and an integrated circuit embedded within the filament; and using the filament to form the 3D-printed object. The material may be characterized as being a plastic. The step of providing the filament may further include melting the material into a liquid state; embedding one or more integrated circuits within the melted material; and extruding the melted liquid material into a wire shape. The step of using the filament to form a 3D-printed object may further include 3D-printing an object so that the embedded integrated circuit is embedded within the object during the 3D-printing. The integrated circuit may be characterized as being a tag for identifying the object, and the method may further include configuring the tag for use while the object is being formed. The integrated circuit may use wireless communication for communicating configuration information with a configuration circuit. The step of providing the filament may further include providing the filament including the material for 3D-printing an object, the integrated circuit coupled to an antenna, the integrated circuit and the antenna embedded within the filament. The antenna may include one of a loop of wire or one or more segments of wire. The antenna may include two wires, each wire having a first end coupled to the integrated circuit and a second end coupled to a magnet, and wherein during using the filament to form the 3D-printed object, the filament may be melted to a relatively low viscosity around the magnets and antenna so that a magnetic attraction between the magnets results in the magnets coupling together and forming a loop antenna. The antenna may be 3D printed on the object using a conductive ink.

In another embodiment, there is provided, a 3D-printing system including: a filament dispenser for storing and dispensing a 3D-printing filament, the 3D printing filament comprising a material for 3D-printing an object, and one or more integrated circuits embedded within the filament; a platform for providing a work surface for supporting the object as the object is being printed; a processor for controlling a printing operation of the 3D-printer; a printer head positioned relative to the platform and coupled to receive the 3D-printing filament from the filament dispenser, the printer head for directing, under control of the processor, deposition of the material for 3D-printing the object and at least one of the integrated circuits embedded within the filament; and an integrated circuit (IC) configuration circuit for configuring the at least one IC as the at least one IC is embedded in the 3D-printed object. The at least one integrated circuit may be one of either a near field communication (NFC) integrated circuit or a radio frequency identification (RFID) integrated circuit. The material for 3D-printing an object may be plastic. The 3D-printing system may further include an antenna coupled to each of the one or more integrated circuits embedded within the filament. The antenna may include a loop of a conductor. The antenna may include two wires, each wire having a first end coupled to the integrated circuit and a second end coupled to a magnet, wherein a magnetic attraction between the magnets coupling together form a loop antenna.

In yet another embodiment, there is provided, a method for embedding integrated circuits into a 3D-printed object, the method may include: melting a plastic material into a liquid state; embedding one or more integrated circuits within the melted plastic material; forming the melted liquid plastic material into a wire shaped filament; providing the filament for 3D-printing an object, wherein at least one of the integrated circuits is embedded within the 3D-printed object when the 3D-printed object is printed; and configuring the at least one integrated circuits while printing the 3D-printed object. The step of embedding one or more integrated circuits within the melted plastic material may further include each of the one or more integrated circuits being coupled to an antenna, the integrated circuit and the antenna embedded within the filament. The antenna may include one of a loop of wire or one or more lengths of wire. The antenna may include two lengths of wire, and wherein the method may further include coupling a magnetic coupler to an end of each of the one or more lengths of wire.

FIG. 1 illustrates a conceptual diagram of 3D-printing system 10 in accordance with an embodiment. 3D-printing system 10 includes a platform 12, printing head 14, nozzle 16, control 18, computer 20, filament dispenser 22, filament 24, and IC configuration circuit 34. Filament 24 includes a plurality of ICs 26. IC configuration circuit 34 includes a wireless interface 36 for communicating with the plurality of ICs as they are used in the 3D-printing of objects, such as object 32 illustrated in platform 12.

Printing head 14 is mounted so that it is free to move as necessary, under the direction of control 18, to print a three-dimensional object. Printing head 14 may also include a motor (not shown) for feeding filament 24 from dispenser 22 to the object being printed. In one embodiment, dispenser 22 includes a reel on which the filament is wound. There may be more than one dispenser in 3D-printing system 10. Printing head 14 may also include a heater (not shown) for melting filament 24 as filament 24 is fed to the object being printed. A conventional mechanism is used to provide the movement of printing head 14. The mechanism may include motors and a moveable support structure. The mechanism can be any conventional mechanism, and is not shown in FIG. 1. The operation of printing head 14 is controlled by control 18. Generally, a computer aided design (CAD) embodiment of the object to be printed is loaded in computer 20. Computer 20 includes a processor for executing CAD software and other applications and control instructions. Computer 20 provides control signals to control 18. Computer 20 may be integrated into 3D printing system 10 or may be a standalone external computer. Control 18 controls the movement of printing head 14 and the extruding of melted material 30 from nozzle 16 to form object 28. Note that object 28 is illustrated as a simple rectangle, but can be any shape. Also, extruded along with the filament material is IC 32. Integrated circuit 32 is embedded within object 28 as part of the extrusion process to form 3D-printed object 28.

Generally, there are many different materials that can be used in filament 24. The choice of material is determined, at least in part, by the intended use of the object being 3D-printed. Many of the materials, as a group, are commonly referred to as "plastic". For purposes of description, this group of materials includes, but is not limited to, polylactic acid (PLA), acrylonitrile butadiene styrene (ABS), polyethylene terephthalate (PET), nylon, thermoplastic elastomers (TPE), polycarbonate (PC), high impact polystyrene (HIPS), polyvinyl alcohol (PVA), wax, acrylonitrile styrene acrylate (ASA), polypropylene (PP), polyoxymethylene (POM), polymethyl methacrylate (PMMA), flexible polyester (FPE), and the like. Other materials that can be used to form filament 24 include wood, metals such as brass, copper, and bronze, various biodegradable materials, conductive, magnetic, clay, ceramic, and carbon fiber. Also, combinations of materials can be used.

Figure 6:
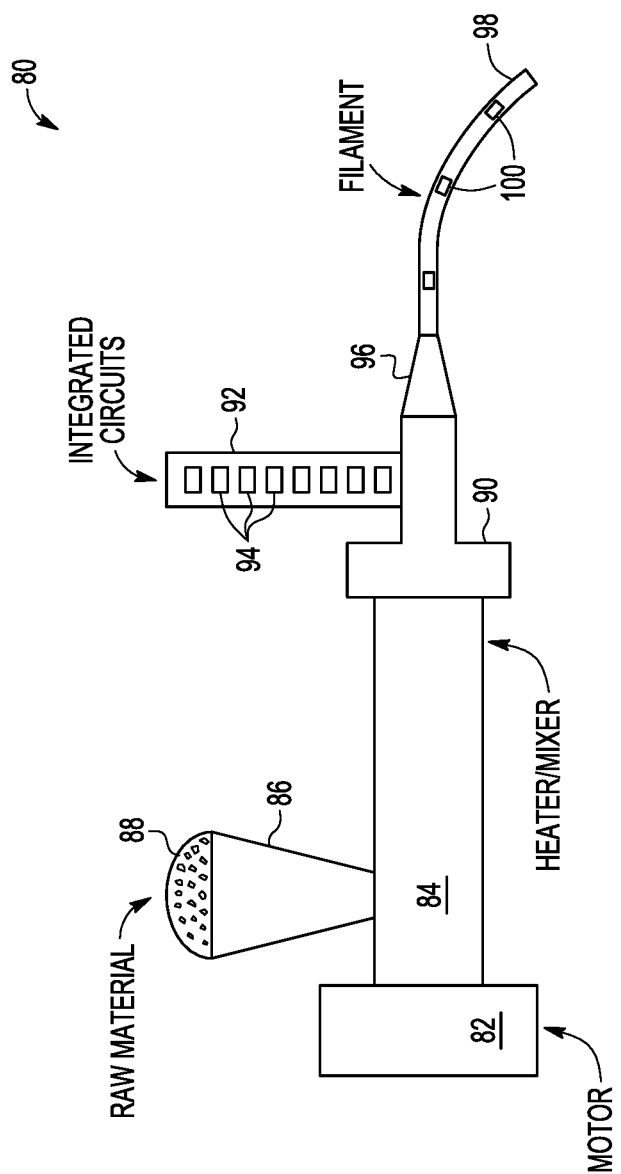
FIG. 6 illustrates a conceptual view of an apparatus for forming a 3D-printing filament in accordance with an embodiment.

The plurality of ICs 26 is embedded within the material used to form filament 24. Typically, the plurality of ICs 26 will be positioned in filament 24 one-by-one as the filament is being formed so that there is a predetermined distance between ICs as illustrated in FIG. 1. The predetermined distance between ICs may be determined by, for example, the number of ICs desired to be embedded within a 3D-printed object and how much material is needed to form the 3D-printed object. Embedding more than one IC in an object may be done for several reasons. For example, using more than one IC provides redundancy. Also, using more than one IC may allow different parts of an object to be identified or authenticated separately to detect modifications to the object. A method and apparatus for forming filament 24 is illustrated in FIG. 6 and will be discussed later.

The ICs can provide any type of functionality. For example, the functionality may include identification, authentication, and physical property measurements such as temperature or spatial orientation. Also, the functionality may include transmitter circuitry for the transmission of various measurements. One limitation on the type of IC is determined by size. The size of each IC cannot be larger than nozzle 16 can extrude. Two common filament sizes are 3 mm and 1.75 mm. To extrude the common filament sizes, a normal sized nozzle may have a diameter of between about 0.3 and 1.2 mm. Many ICs used as tags have a smaller size than some of the common filament sizes. However, most ICs are larger than the normal nozzle diameter. To accommodate the embedding of an IC having a larger diameter than the normal nozzle diameter, a larger diameter nozzle may be temporarily fitted for printing the IC. Because the IC is being embedded within an object, the larger track of molten filament material deposited by the larger nozzle should not be a problem for printing a relatively smaller portion of the interior of most 3D printed objects. The larger the nozzle, the larger the IC that can be extruded with the filament material.

As stated previously, the plurality of ICs 26 may be characterized as being tags. The tags can be active or passive tags used for identification and other purposes. In one embodiment, the tags use RFID (radio frequency identification) for communication with an RFID reader. In another embodiment, the tags use near field communication (NFC) for wireless communication with an NFC reader. The use of tags is well known. Integrated circuits used as tags can be formed to have very small dimensions relative to other types of ICs. In a 3D-printing system that has more than one filament dispenser, one of the filament dispensers may have a filament with the ICs while the other filament dispenser(s) have only a printing material. Alternately, the different filament dispensers may have filament with different IC types having different functionality.

Tags may require configuration before use. Typically, the tags are not configured when they are embedded within filament 24. This allows a supplier to provide the filament with the ICs to any manufacturer that wants to use them. The configuration can occur just before the IC is inserted into the printed object 30. If wireless communication can be assured through the material, then the configuration can occur after the IC is inserted. Also, the configuration may be performed while filament 24 is still in filament dispenser 22 if all the ICs are to be configured the same way. An object may have multiple embedded ICs that are each configured differently. To facilitate the configuration, IC configuration circuit 34 may be positioned near enough to printing head 14 to allow wireless communication between IC configuration circuit 34 and the IC being configured. A conventional wireless communication protocol can be used, such as NFC or RFID, which will partially control the transmission distance. Also, IC configuration circuit 34 may be controlled by control 18 so that the configuration operation may be timed with the printing operation. Configuration can mean that some firmware is inserted into the IC or that some identity is attached, for example, a cryptographic key is set in the IC. Configuration may also include object or device registration in a database. The embedded IC may be registered in the database at the moment the object starts to be used. Thus, not only the IC, but an entire system including the IC can be configured at the same time. Configuration may include activation. The IC may be activated for use, with or without the communication of keys and firmware. There can also be other types of configuration.

Figure 2:
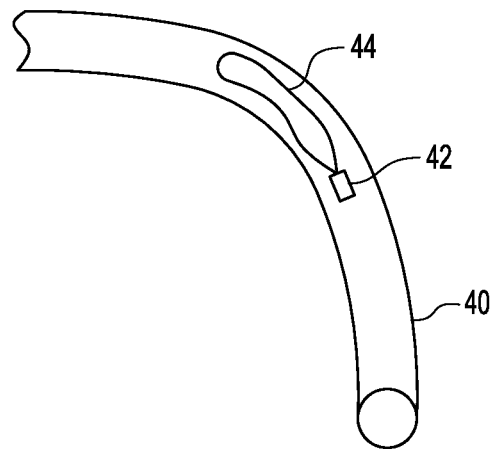
FIG. 2 illustrates a portion of a 3D-printing filament in accordance with an embodiment.

FIG. 2 illustrates a portion of 3D-printing filament 40 in accordance with an embodiment. 3D-printing filament 40 includes IC 42 and antenna 44. Each IC in filament 40 may have an antenna attached. Antenna 44 is a loop antenna formed from a conductive wire. In one embodiment, the conductive wire is formed from a metal such as copper. Antenna 44 is used by IC 42 for transmitting and receiving wireless communications. Also, antenna 44 may be used to power IC 42. As is well known in the art, a current can be induced in a wire when the wire is in the presence of an electromagnetic RF field. Passive RFID tags are typically powered this way. Other types of ICs can also be powered inductively. In other embodiments, the antenna may be formed using a conductive ink printed on the object instead of a dispensed wire. Also, in another embodiment, a battery for powering the IC may be embedded in the object along with the IC.

Figure 3:
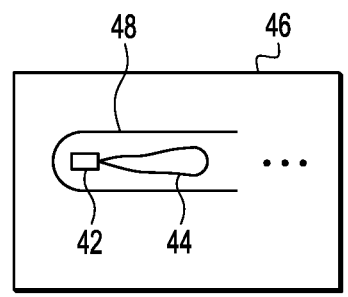
FIG. 3 illustrates a top-down view of a 3D-printed object being formed with the filament of FIG. 2 in accordance with an embodiment.

FIG. 3 illustrates a top-down view of 3D-printed object 46 while it is being formed with filament 40 of FIG. 2 in accordance with an embodiment. Referring to FIG. 2 and FIG. 3, filament 40 is melted to a liquid state by the printing head and dispensed onto object 46 forming a molten track 48 of material. For the purposes of simplicity and clarity, object 46 is illustrated as a rectangle of material. In other embodiments, the object can be any shape. Integrated circuit 42 and antenna 48 are dispensed onto object 46 in one layer during forming of object 46. In other embodiments, multiple layers may be used to dispense IC 42 and antenna 48. In FIG. 3, IC 42 is dispensed in the molten material first followed by antenna 44 as material is dispensed from left to right in one continuous path without stopping the flow of material or raising the nozzle from the object being formed. Therefore, to ensure the IC and antenna are dispensed reliably, the firmware for controlling the 3D-printing system should be programmed to know the length of the antenna. In other embodiments, the antenna may be dispensed through a nozzle before the IC is dispensed. Subsequent layers are then formed over the layer having IC 42 and antenna 44, embedding IC 42 and antenna 44 in object 46.

Different 3D-printing materials required different ranges of temperatures for 3D-printing. For most of the commonly used materials, the temperature may range between 165 and 250 degrees Celsius. This temperature range is outside of the operating temperature range set for most ICs. However, exposure to this temperature would be for a relatively short time, and not while the ICs are operating and should not damage most ICs.

Figure 4:
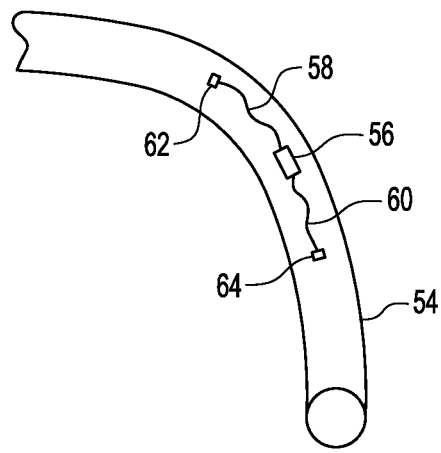
FIG. 4 illustrates a portion of a 3D-printing filament in accordance with an embodiment.

FIG. 4 illustrates a portion of 3D-printing filament 54 in accordance with another embodiment. 3D-printing filament 54 includes an embedded IC 56 and two antenna segments 58 and 60, both attached to IC 56. Each of antenna wire segments 58 and 60 may be formed from a metal such as copper, and has a first end and a second end. The first end of antenna segments 58 and 60 is connected to IC 56. The second end of wire 58 is connected to magnet 62 and the second end of wire 60 is connected to magnet 64. When connected, magnets 62 and 64 function as a connector to form a wire loop with wire segments 58 and 60. Filament 54 may include a plurality of ICs coupled to wire segments as illustrated in FIG. 4.

Figure 5:
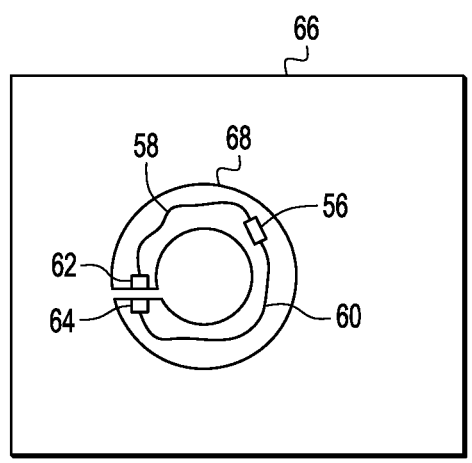
FIG. 5 illustrates a top-down view of a 3D-printed object being formed with the filament of FIG. 4 in accordance with an embodiment.

FIG. 5 illustrates a top-down view of 3D-printed object 66 being formed with the filament 54 of FIG. 4 in accordance with an embodiment. Referring to FIG. 4 and FIG. 5, filament 54 is melted to a liquid state by the printing head and dispensed onto object 66 forming a molten track 68 of material. For the purposes of simplicity and clarity, object 66 is illustrated as a rectangle of material. In other embodiments, the object can be any shape. Integrated circuit 56, wire segments 58 and 60, and magnets 62 and 64 are dispensed along with the molten material. To form a closed loop and to allow the magnets to connect with each other, the molten track 68 is formed to provide a closed loop having a length approximately equal to the combined length of IC 56, wires 58 and 60, and magnets 62 and 64. The closed loop can be any shape. For IC and antenna dispersal, molten track 68 begins at magnet 62 and ends with magnet 64 being placed proximate to magnet 62 so that when the material enclosing the two magnets is re-melted to a relatively low viscosity, the magnetic attraction of the two magnets to each other will cause a magnetic connection to be formed, closing the loop. Note that in another embodiment, there may be only one wire segment having one end attached to the IC and the other end connected to a magnet. The other magnet may be attached directly to the IC. As discussed above in the description of FIG. 2, IC 56 may be a passive device that is powered inductively from its loop antenna.

FIG. 6 illustrates a simplistic view of an apparatus 80 for forming a 3D-printing filament in accordance with an embodiment. Apparatus 80 includes a motor 82, heater/mixer 84, raw material hopper 86, raw material 88, feed pipe 90, IC cartridge 92, ICs 94, and nozzle 96. In one embodiment, raw material 88 is a plastic. Heater/mixer 84 receives raw material 88 and heats the material to a molten, liquid state. The mixer portion of heater/mixer 84 may be a screw-type of mixer. In other embodiments, other mixer types may be used. The mixer is powered by motor 82 and draws liquid material into feed pipe 90. The material is maintained at a constant pressure to ensure the diameter of the extruded material through nozzle 96 has a constant cross-section. Cartridge 92 inserts ICs 94, one-at-a-time into the liquid material in feed pipe 90. The rate of insertion of ICs can be adjusted to control the spacing between the ICs 100 in the resulting filament 98. The ICs may also include an antenna as illustrated in FIG. 2 or FIG. 4. A width of cartridge 92 would be adjusted to accommodate the additional length of an antenna. As filament 98 is extruded through nozzle 96, it solidifies and may be wound onto a reel as it is being made. The reel can then be used as a dispenser such as dispenser 22. The amount of bend in filament 98 is relatively low as it is wound, so the material is not under any significant stress until being used in a 3D-printed object.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, NVM, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for embedding an integrated circuit into a 3D-printed object, the method comprising:
   providing a filament comprising a material for 3D-printing an object, and an integrated circuit embedded within the filament, wherein the integrated circuit is characterized as being a tag for identifying the object;
   using the filament to form the 3D-printed object; and
   configuring the tag for use while the object is being formed.

2. The method of claim 1, wherein the material is characterized as being a plastic.

3. The method of claim 1, wherein providing the filament further comprises
   melting the material into a liquid state;
   embedding one or more integrated circuits within the melted material; and
   extruding the melted liquid material into a wire shape.

4. The method of claim 1, wherein using the filament to form a 3D-printed object further comprises 3D-printing an object so that the embedded integrated circuit is embedded within the object during the 3D-printing.

5. The method of claim 1, wherein the integrated circuit uses wireless communication for communicating configuration information with a configuration circuit.

6. The method of claim 1, wherein providing the filament further comprises providing the filament comprising the material for 3D-printing an object, the integrated circuit coupled to an antenna, the integrated circuit and the antenna embedded within the filament.

7. The method of claim 1, wherein the antenna comprises one of a loop of wire or one or more segments of wire.

8. The method of claim 1, wherein the antenna comprises two wires, each wire having a first end coupled to the integrated circuit and a second end coupled to a magnet, and wherein during using the filament to form the 3D-printed object, the filament is melted to a relatively low viscosity around the magnets and antenna so that a magnetic attraction between the magnets results in the magnets coupling together and forming a loop antenna.

9. The method of claim 1, wherein the antenna is 3D printed on the object using a conductive ink.

10. A method for embedding integrated circuits into a 3D-printed object, the method comprising:
    melting a plastic material into a liquid state;
    embedding one or more integrated circuits within the melted plastic material wherein the integrated circuit is characterized as being a tag for identifying the object;
    forming the melted liquid plastic material having the one or more embedded integrated circuits embedded therein into a wire shaped filament;
    providing the filament for 3D-printing an object, wherein at least one of the integrated circuits is embedded within the 3D-printed object when the 3D-printed object is printed; and
    configuring the at least one integrated circuits while printing the 3D-printed object.

11. The method of claim 10, wherein embedding one or more integrated circuits within the melted plastic material further comprises each of the one or more integrated circuits coupled to an antenna, the integrated circuit and the antenna embedded within the filament.

12. The method of claim 11, wherein the antenna comprises one of a loop of wire or one or more lengths of wire.

13. The method of claim 11, wherein the antenna comprises two lengths of wire, and wherein the method further comprising coupling a magnetic coupler to an end of each of the one or more lengths of wire.

* * * * *